United States Patent Office
3,314,291
Patented Apr. 18, 1967

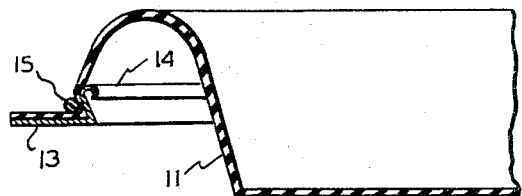
FIG.2
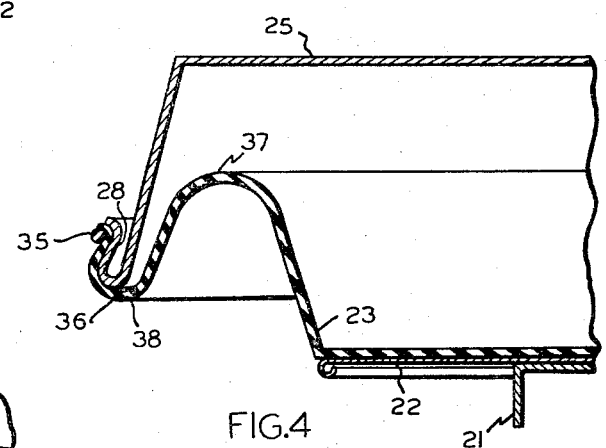
FIG.4
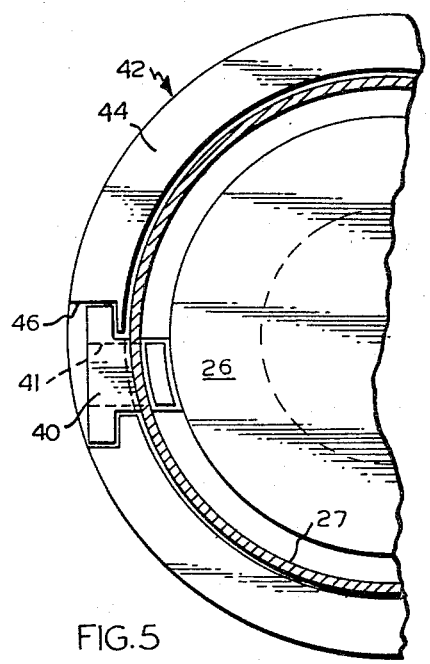
FIG.5
FIG.6

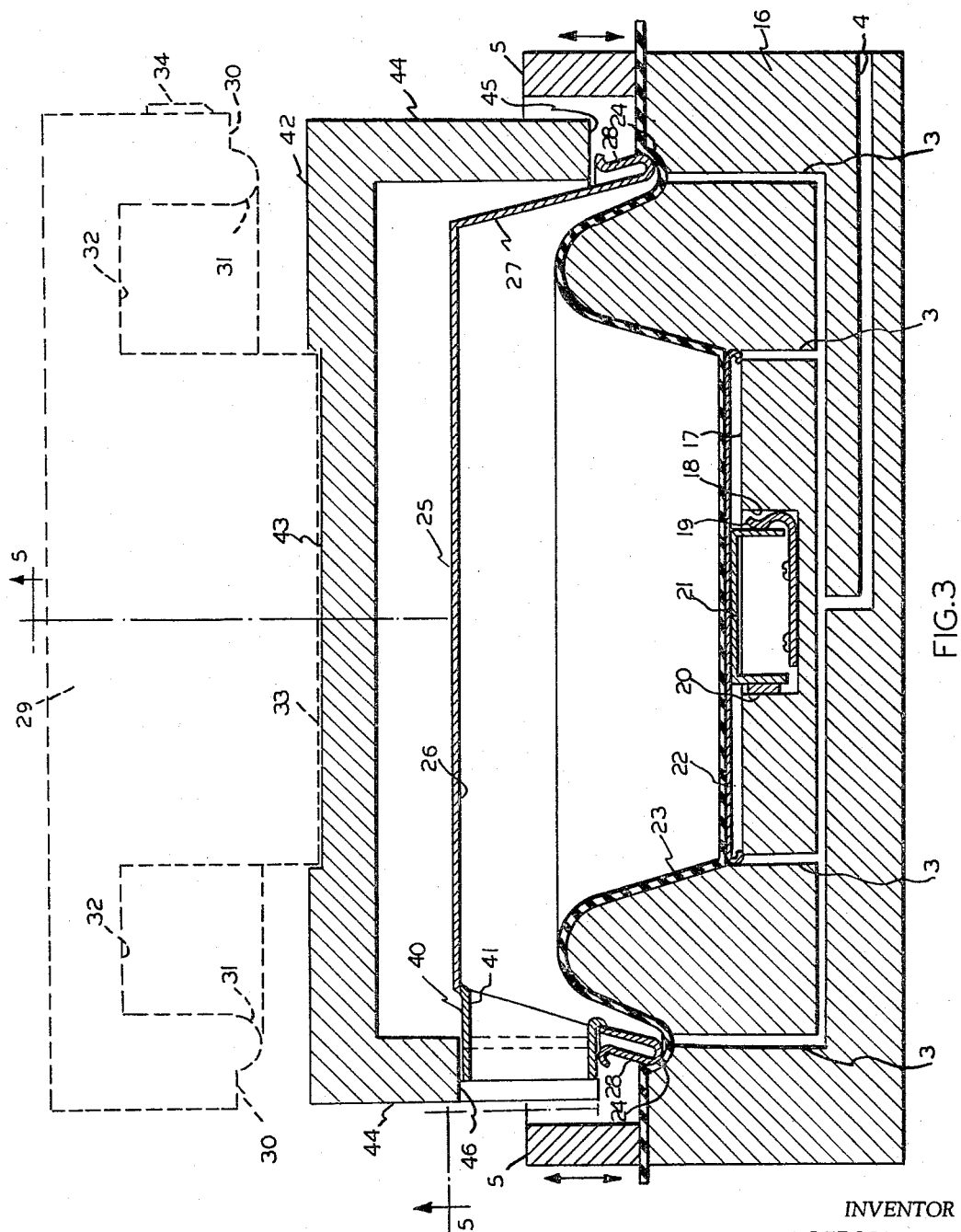

3,314,291
DIAPHRAGMS FOR METERING DEVICES
Parker S. Anderson, Lexington, Va., assignor to Reeves Brothers, Inc., New York, N.Y., a corporation of New York
Filed Dec. 23, 1963, Ser. No. 332,801
7 Claims. (Cl. 73—278)

This invention relates to diaphragms for fluid metering devices, such as, gas meters, and, more particularly, relates to novel diaphragms and novel methods and equipment for making them.

The manufacture of diaphragms for gas measuring equipment is highly precisional and specialized, requiring the highest possible degree of skill and reproducible accuracy. Each diaphragm must have a particular configuration and, whether they are circular, oval, square, rectangular, trapezoidal, cylindrical or otherwise shaped, they must be identical with each other diaphragm of the same type in order to be capable of providing the same, consistently accurate, measurements when installed in measuring or control apparatus. For example, when the diaphragms are circular they must have identical radial cross-sections in all directions in order to be reliable. Any flaws or differences in the radial cross-sections give rise to unpredictable resistances to the proper flexure of the diaphragm resulting in inconsistent movements thereof and unpredictable measurements. In some cases, such inconsistencies can be corrected but, in many cases, no correction is possible.

Certain of these inconsistencies are believed to be due to the formation of wrinkles in the diaphragm during production. The problem involved lies in shaping a flat sheet of curable membrane stock into a curved and shaped form. Such a form involves complex curves three dimensionally. For example, when circular or oval diaphragms are made, the sheet material must not only conform to the circular or oval pattern but must also be formed into a curved trough-like cross-section as well.

Heretofore, a large majority of diaphragms were made manually wherein a sheet of curable membrane stock was placed between molds and wrinkles removed by manually tugging at the corners and sides of the sheet. Even with the greatest amount of care, incipient wrinkles, formed by causing the flat sheet to take on a complex curved configuration, remained in the finally cured diaphragm.

A common type of diaphragm assembly utilizes a pan having a peripheral lip to which the peripheral portions of the shaped membrane are attached. An improvement on this type of diaphragm assembly is illustrated and described in co-pending application Ser. No. 107,280, filed Mar. 14, 1961, by C. Vernon Watson. The improved pan type assembly is best shown in FIGS. 6, 7, 8, 13 and 15. In this type of diaphragm it is noted that the gas contacting surface or inner surface of the membrane is formed into a circular trough-like configuration just inwardly from the outer periphery of the pan. It has been found that, by reversing or inverting this trough such that the inner gas contacting surface of the membrane forms a ridge rather than a trough, undesirable aberrations due to inconsistent movement of the membrane, e.g., crinkling, crimping, creasing, etc., as the center piece sequentially moves toward and away from said pan by the action of fluid in the pan are considerably reduced and, in some cases, eliminated. It has also been found that, by attaching the peripheral portions of the membrane along the outer side of the pan lip and forming a reverse curvature in the membrane such that it extends from said lip in a slight outward direction and thence into the pan to form the above-mentioned ridge, the above-mentioned aberrations during service of the diaphragm assembly are even further reduced or elimintaed.

It has also been found that aberrations and inconsistencies during operation can be considerably further reduced or eliminated in many cases by bonding the peripheral membrane portions to the lip and also clamping said peripheral portions to the lip. Similar advantages are obtained in the type of diaphragm assembly employing a relatively rigid flange ring having an annular lip extending from the inner periphery thereof and to which the peripheral portions of the membrane are attached.

It is therefore a primary object of this invention to provide for the manufacture of diaphragms which are characterized by a minimum or absence of incipient wrinkles.

Another object is the provision of a novel process and novel apparatus for making precision diaphragms, each being of substantially the same characteristics as each other.

Another object is the provision of novel processes and apparatus for making precision diaphragms capable of providing the same consistently accurate measurements when employed in metering devices.

Another object is the provision of a novel type of diaphragm which avoids or considerably reduces errors due to crumpling, crinkling, folding, etc., during use in a metering device.

Another object is the provision of novel processes and apparatus for producing precision diaphragms at high rates of production.

Further objects and advantages of this invention will be apparent from the following detailed description of embodiments thereof described in conjunction with the attached drawings, in which:

FIG. 2 is a partial cross-section of the novel flange type diaphragm made in the apparatus of FIG. 1;

FIG. 3 is a cross-section of the molding apparatus employed in making the pan type diaphragm assembly in accordance with this invention;

FIG. 4 is a partial cross-section of the pan type diaphragm made with the apparatus shown in FIG. 3;

FIG. 5 is a sectional view on line 5—5 of FIG. 3; and

FIG. 6 is a partial cross-section of a novel flange type diaphragm wherein the membrane area is similar in configuration to that of the membrane shown in FIG. 4.

Figure 1:
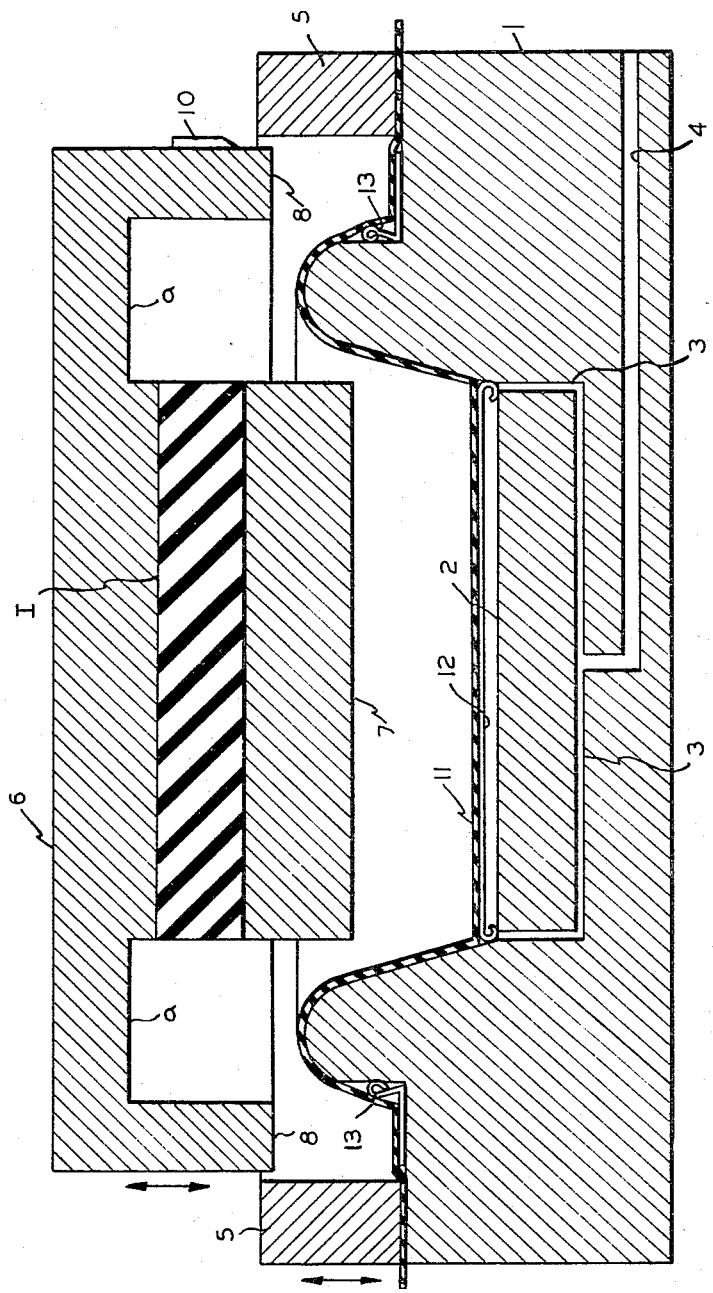
FIG. 1 is a cross-section of molding apparatus employed in making the flange ring type of diaphragm in accordance with this invention.

Referring to FIG. 1, there is shown a vacuum mold 1 formed with an upper mold face 2 substantially in the outline and configuration of the desired finished diaphragm. The mold 1 is formed internally with vacuum lines 3 which open onto the mold face 2. Several vacuum lines 3 are preferably provided, e.g., in the case of a circular mold, four, eight or twelve vacuum lines opening onto the mold face at points spaced equally apart around the circumference of said mold face can be employed. It is of special advantage to locate the vacuum lines 3 to open onto the face 2 at points of the deepest corners of said face and/or where the membrane sheet which is to conform with said face makes an abrupt change in direction, as best shown in FIG. 3. A main vacuum line 4 connects to all vacuum lines 3 and is connected to a suitable source of vacuum.

A stripper ring 5 is positioned above the mold face 2 and has a lower flat face formed in the outline of the peripheral upper portions of said mold face. The stripper ring 5 is adapted to be lowered into contact with those portions of the membrane sheet covering said peripheral portions of the mold face. As shown in FIG. 1, stripper ring 5 is in its lowermost position compressing the membrane sheet against said peripheral portions.

Also positioned above the mold 1 is a top plug 6 adapted to pass within the inner periphery of stripper ring 5. The top plug 6 is formed with a lower central surface 7 and a lower peripheral surface 8. The lower central surface 7 is formed in substantially the same outline as the central portion of mold face 2. The lower peripheral surface is formed substantially in the same outline as those portions of mold face 2 adjacent to and inward from the peripheral surface of mold face 2. The top plug 6 is also formed with a recess 9 which is of sufficient size to accommodate the raised portions of mold face 2, i.e., the ridge portion, when said top plug is in its lowermost position and its surfaces 7 and 8 are compressing respective portions of the membrane sheet against mold face 2.

A trimming knife 10 is also positioned above mold 1 between the outer perimeter of top plug 6 and the inner perimeter of stripper ring 5. The trimming knife is adapted to lower into cutting contact with the membrane material disposed on mold face 2 when top plug 6 is in its lowermost position. The knife 10 is adapted to cut the membrane sheet all around the outer perimeter of top plug 6 and can be either a blade rotating along said outer perimeter or it can be of a circular punch-die type adapted to be lowered and cut through said membrane sheet.

As shown in FIG. 1, a membrane sheet 11 overlies and is shown as conforming to the mold face 2. A relatively rigid center member 12 is disposed on the central portion of said mold face and a flange ring 13 is positioned on those portions of said mold face adjacent to and inward from the peripheral portion of said mold face. The membrane 11 overlies the upper surfaces of center member 12 and flange ring 13. These upper surfaces are preferably coated with a dry bonding material or adhesive which is curable upon the application of heat. The membrane sheet is also preferably made of a material which is curable into thermoset form by the application of heat. A common type of membrane sheet which is preferably employed in this invention is one which comprises a fabric coated with a thermosetting rubber or resin which is flexible or pliable in its thermoset form. Such membrane sheets and adhesives are described in more detail in the above-identified co-pending application.

The mold 1 is heated to at least the minimum curing temperature of the membrane sheet and adhesive. It is preferable to maintain said mold at a temperature above said minimum curing temperature although, of course, the mold need only be maintained at said temperature when the membrane sheet and adhesive are in the curing cycle. This, of course, would entail the use of timed heating equipment, the cost of which may not be justified by the amount of heat saved, if any. It is quite adequate and economical to continually maintain the mold at a temperature above the aforementioned curing temperature.

Additionally, the top plug 6 can be heated to the curing temperature or above. As shown in FIG. 1, lower central surface 7 of top plug 6 is provided with a heat insulating plate I between surface 7 and the remainder of top plug 6. This permits the maintenance of surface 7 at a different temperature than surface 8 of the top plug 6 and mold face 2 of the mold 1, i.e., that portion of said top plug between insulation I and surface 7 can be provided with a separately controlled heat source as can the portion between insulation I and surface 8. This will accommodate adhesives and membrane sheets which cure at different temperatures and permits avoidance of overheating one and/or the other.

In operation, the center member 12 and the flange ring 13 are positioned in their respective places on the mold face 2. A membrane sheet 11 is placed over mold face 2, center member 12 and flange ring 13. Stripper ring 5 is lowered and forced against the peripheral portions of membrane 11 to compress said portions against mold face 2. Vacuum is then applied through lines 3 and 4 and the membrane is drawn into the center cavity of mold face 2. As the membrane is drawn into the mold cavity, the outer portions thereof slide between stripper ring 5 and the peripheral portions of mold face 2 and almost conforms throughout to said mold face. This sliding of the membrane serves to eliminate some wrinkling.

After the application of vacuum, top plug 6 is lowered and central surface 7 and peripheral surface 8 thereof contact the respective portions of membrane sheet 11 and compress such portions against the respective portions of mold face 2. This compressing action not only completes the formation of membrane 11 faithfully to the configuration of mold face 2, i.e., especially completes the formation of the corners and deepest portions of said membrane, but also presses out wrinkles remaining after the above-mentioned sliding action under stripper ring 5. The compression of surfaces 7 and 8 also provides pressures for bonding center member 12 and flange ring 13 to the membrane 11.

After top plug 6 is in its lowermost position, stripper ring 5 is raised and trimming knife 10 is applied against the membrane 11 to cut it along the outer perimeter of top plug 6. This trimming action, while top plug 6 is compressing portions of membrane 11 against mold face 2, assists further in the removal or pressing out of wrinkles by the compressing action of top plug 6 on said membrane. It is preferred to release vacuum by opening lines 3 and 4 to the atmosphere when top plug 6 reaches its lowermost position to avoid the possibility of pore formation. Top plug 6 is not raised until curing of the membrane and bonding adhesive has been completed. Thereafter, top plug 6 is raised. Trimming knife 10 is preferably raised after completion of its trimming action but, if desired, can be raised when top plug 6 is raised. Thereafter, the formed and cured membrane is removed from mold 1 and another center member, flange ring and membrane sheet are placed on mold face 2 for forming the next diaphragm. This cycle of operations is repeated as many times as desired to form and cure the desired number of diaphragms.

After removal from mold 1, the diaphragm is preferably further processed by applying a clamping device for clamping membrane 11 to flange ring 13, as best shown in FIG. 2. In this figure, the flange ring 13 is formed with an upwardly extending lip 14 from the inner periphery of said flange ring. A clamping band or clamping wire or clamping spring 15 is applied around the membrane 11 adjacent lip 14 and is tightened to clamp said membrane against said lip. The clamping band, wire or spring 15 is not essential since the periphery of membrane 11 is adhesively bonded to the upper flange surface of flange ring 13. However, the use of clamping band, wire or spring provides additional advantages in preventing crumpling or crinkling of the free areas of membrane 11 when the diaphragm is in use in a metering device.

In addition, clamping band, wire or spring 15 provides additional protection in metering dirty or solvent-enriched gases or fluids to assure a permanent connection between the fabric-reinforced membrane and the metal flange ring even where chemical attack on the adhesive or synthetic coating on the fabric might otherwise cause separation. This is in keeping with the advantages of the fabric reinforced, coated membrane, which maintains dimensional stability even under severe chemical attack, as opposed to film or gum membranes which swell and become distorted under these conditions.

Referring to FIG. 3, there is shown another embodiment of a mold 16 having an upwardly directed mold face 17 and vacuum lines 3 opening onto said face and main vacuum line 4 connected to a source of vacuum. The mold face defines the shape of the desired diaphragm and in its central portions is formed with a recess 18. A fixture comprising a spring metal strip 19 and a guide block 20 is mounted in said recess for positioning a bracket 21 mounted on a center disc 22 which, in turn, is positioned on the central portion of the mold face 17 for attachment to the membrane sheet 23. The outer peripheral portions of mold face 17 are flat and just inwardly from said portions there is provided an endless groove 24 extending around said mold face.

A pan 25 intended for attachment to the membrane sheet is formed with a bottom 26 and an endless side wall 27 extending at an angle from said bottom and being turned outwardly at its free end and thence toward said bottom to form an endless lip 28. The endless lip 28 is of such circumferential size as to fit partially within groove 24 without extending to the bottom thereof, as best shown in FIG. 3, such that those portions of the lip just beyond the point where side wall 27 turns back towards bottom 26 come into contact with membrane overlying said groove. These contacting portions of lip 28, as well as the upper surface of center disc 22, are coated with a dry bonding adhesive which is curable by heat to form a bond.

A stripper ring 5, having a lower face which is substantially of the same outline as the upper peripheral portions of mold face 17, is positioned above said mold face and is adapted to move downwardly into contact with membrane sheet 23 overlying said mold face, as shown in FIG. 3. A top plug 29, shown in outline in FIG. 3, is formed on its underside with a flat peripheral face 30 of smaller circumference than the lower face of stripper ring 5, an endless ridge 31 disposed inwardly from said periperal face, an endless recess 32 disposed inwardly from said ridge and a flat central face 33. The endless ridge 31 is of such size and shape as to substantially mate with the endless groove 24 in the mold face. When top plug 29 is in its lowermost position, the peripheral face 30 compresses membrane sheet 23 against the mold face 17 just outward from groove 24; ridge 31 compresses membrane sheet 17 against groove 24 and central face 33 compresses membrane sheet 23 against the upper surface of center disc 22. The endless recess 32 is of such size and shape as to readily accommodate the upwardly projecting portions of mold face 17 and membrane sheet covering same without contacting said sheet.

A trimming knife 34 of a similar type to trimming knife 10 of FIG. 1 is disposed in relation to top plug 29 in a similar manner as knife 10 is positioned in respect to top plug 6.

The pan 25, as best shown in FIGS. 3 and 5, is provided with a duct or port 40 having a channel 41 passing through wall 27. A pan of this construction is widely employed in gas meters.

A pressure pad 42 is positioned above the mold 16 between it and top plug 29. The pressure pad 42 is movable axially with respect to mold 16 and can be moved axially by means of top plug 29 or can be provided with its individual moving means. Preferably, pressure pad 42 is adapted to laterally swing into axial alignment with mold 16 between said mold and top plug 29. Top plug 29 can be guided in its vertical movement so as to move at all times co-axially with mold 16. Pressure pad 42 is formed on its upper surface with a circular recess 43 of substantially the same configuration as central face 33 of said top plug such that said face enters said recess to accurately align pressure pad 42 of the said top plug and mold 16.

Pressure pad 42 is also formed with a circular side wall 44 having a flat peripheral face 45 on its lower surface. The peripheral face 45 is of a size and shape to contact substantially overall the free edge of lip 28, as best shown in FIG. 3. The side wall 44 is formed with a cutout 46 which receives port 40 to properly and accurately align the pan 25 in respect to the membrane 23, the center disc 22 and bracket 21. The walls of recess 43 and cutout 46 can be tapered inwardly so as to facilitate, respectively, entry of face 33 into said recess and port 40 into said cutout.

In operation, center disc 22 on which is mounted bracket 21 is positioned on the central portion of mold face 17 such that said bracket is disposed within recess 18 and accurately positioned therein by means of strip 19 and guide block 20. A membrance sheet 23 is then placed over mold face 17 and stripper ring 5 is lowered to compress the peripheral portions of said sheet against the peripheral portions of said mold face, thereby sealing said sheet all around to said mold face.

Vacuum is then applied through lines 3 and 4 to draw said sheet into approximate conformity with said mold face. As the sheet 23 is thus drawn into approximate overall contact with the mold face 17 and center disc 22, the outer portions thereof slide between the lower face of stripper ring 5 and the peripheral portions of mold face 17, thus preventing the formation of a large amount of wrinkles.

Thereafter, top plug 29 is moved to its lowermost position such that faces 30, 31 and 33 compress respective portions of membrane sheet 23 against the mold face 17 and center disc 22. Stripper ring 5 is then raised. The compression of membrane sheet 23 by faces 30, 31 and 33 against mold face 17 and center disc 22 functions to press out additional wrinkles not prevented by the action of stripper ring 5. Top plug 29 is held in its lowermost compressing position until membrane sheet 23 has cured under the heat from mold 16. Any suitable heating means for the mold, e.g., electrical heating means, hot oil heating means, etc., is provided. At the same time, the heat causes the adhesive on the upper face of center disc 22 to bond it to membrane sheet 23.

After top plug 29 has moved to its lowermost compressing position, trimming knife 34 is actuated to sever said membrane sheet along the outer perimeter of said top plug. This is preferably done just after top plug 29 has reached its lowermost position, i.e., before membrane sheet 23 has cured to any great extent, and such severing unexpectedly assists in further prevention or removal of wrinkles.

After membrane sheet 23 and the bonding adhesive on center disc 22 have cured, top plug 29 is raised along with knife 34. Thereafter, pan 25 having a dry bonding adhesive coated on lip 28 is placed such that lip 28 extends partially into groove 24, as shown in FIG. 3. Pressure pad 42 is swung laterally into axial alignment with top plug 29. Top plug 29 is then lowered such that central face 33 thereof enters recess 43 of said pressure pad thereby accurately axially aligning said pad with said top plug and mold 16. As top plug 29 continues to lower, it forces pressure pad 42 downwardly such that peripheral face 45 presses against the free edge of lip 28 thereby pressing said lip against membrane sheet 23 disposed in the upper outer wall of groove 24. The heat from mold 16 cures the bonding adhesive on lip 28, thus bonding membrane sheet 23 thereto. Thereafter, top plug 29 and pressure pad 42 are raised and the completed diaphragm pan assembly is removed.

Although it is not essential for the proper operation of the diaphragm pan assembly described in connection with FIG. 3, it is advantageous to clamp the outer peripheral portions of membrane sheet 23 to the lip 28 in the manner shown in FIG. 4. In this figure, there is shown a clamping band, wire or spring 35 extending around the outer perimeter of lip 28. Said clamping band, wire or spring is tightened on membrane sheet 23 against lip 28 to tightly clamp said sheet against said lip. It has been found that the combination of adhesively bonding, e.g., at 36 in FIG. 4, in addition to clamping by means of band, wire or spring 35 as means for securing membrane sheet 23 to lip 28 provides unexpected advantages in eliminating or greatly reducing crumpling or crinkling of the free area of sheet 23 when the assembly is in use in metering devices. It has also been found that the configuration of membrane sheet shown in FIG. 4, i.e., wherein an endless trough 37 extends into the pan 25 around center disc 22 and an endless ridge 38 is formed around said trough 37 and is secured to lip 28, provides a diaphragm assembly which is of far superior precision in use than heretofore known assemblies of similar type. Heretofore, diaphragms of the pan assembly type were made with membrane sheets formed with an endless trough extending out of pan 25. Such prior configurations provided inconsistencies and aberrations in service because of crumpling or crinkling of the membrane free area as center disc 22 moved towards and away from said pan by the action of fluid being measured. The diaphragm configuration shown in FIG. 4 provides a rolling type of movement as center disc 22 moves toward and away from pan 25, thereby avoiding or greatly lessening crumpling and crinkling of the membrane free area. Consequently, more consistently accurate measurements are provided by the FIG. 4 configuration and diaphragms of considerably longer life result inasmuch as repeated crumpling and crinkling of the free area physically breaks down the membrane.

While the drawings and description herein are primarily directed to circular diaphragms, the present invention is applicable to diaphragms of any outline, e.g., oval, square, rectangular, trapezoidal, and the like. The construction of and materials employed in the membrane sheets, center discs, brackets, pan, flange rings, etc., employed herein are more fully described in the above-mentioned co-pending application. The pans, center discs, brackets, flange rings and other relatively rigid elements can be made of plastic or metal or any other suitable relatively rigid material. The center discs can also be perforated so as to reduce their weight and since said center discs and all attachments thereto, e.g., brackets are moving during operation of the metering devices in which they are installed, it is preferable to make them of the lightest weight possible to avoid loss of power as much as possible. The bracket 21 can be replaced with one or more studs fixed to disc 22. After molding of the membrane 23 and bonding of disc 22 thereto as described above, a bracket similar to 21 can be connected to said studs. This provides the advantage of permitting the bracket attached to the disc to be interchanged or replaced. The bracket can be injection molded of nylon or the well known bronzed bracket.

FIG. 6 illustrates a flange ring type of diaphragm assembly wherein the membrane has a similar configuration to that of the pan type of diaphragm assembly shown in FIG. 4 and produced by the apparatus shown in FIGS. 3 and 5. Thus, FIG. 6 shows a flange ring 47, membrane 48, center disc 49 and clamping band or wire 50. The membrane 48 is formed with an endless trough 51 around center disc 49 and an endless ridge 52 around said trough. The endless ridge 52 is secured to flange ring 47 by means of an adhesive between said flange ring and membrane 48. Clamping band or wire 50 additionally clamps the membrane 48 to flange ring 47. This diaphragm construction provides a rolling type of movement as center disc 49 reciprocates axially, thereby avoiding or greatly lessening crumpling or crinkling of the membrane free area. As a result, more consistently accurate measurements are provided by the FIG. 6 configuration and diaphragms of considerably longer life result inasmuch as repeated crumpling and crinkling of the free-area is avoided.

The movements of the stripper rings, top plugs and rimming knives herein can be accomplished in any suitable manner, e.g., as shown in the above-mentioned co-pending application or in co-pending application Ser. No. 101,172, filed April 6, 1961, by C. Vernon Watson, now U.S. Patent No. 3,162,899.

While in accordance with the provisions of the statutes, I have illustrated and described herein a specific form of the invention now known to me, those skilled in the art will understand that changes may be made in the form of the apparatus disclosed without departing from the spirit of the invention covered by my claims and that certain features of the invention may sometimes be used to advantage without a corresponding use of the other features.

What is claimed is:

1. An improved gas meter diaphragm assembly comprising a pan having a bottom and a side wall extending upwardly for a distance from said bottom at an angle thereto, thence turning outwardly and downwardly and terminating in an annular lip; and a diaphragm membrane comprising a flexible, impermeable sheet formed with a central portion, an endless trough of substantially uniform cross-sectional size and shape surrounding said central portion and extending toward the bottom of said pan, an endless ridge of substantially uniform cross-sectional size and shape surrounding said trough and extending away from said bottom; the annular portion of said membrane being formed substantially in the outline of the lip of said pan, said annular portion being bonded to said lip.

2. The improved gas meter diaphragm assembly claimed in claim 1 wherein said annular portion of said membrane is additionally clamped to said lip.

3. The improved gas meter diaphragm assembly as claimed in claim 1 wherein said pan and said membrane are circular and coaxial.

4. The improved gas meter diaphragm assembly as claimed in claim 1 wherein said membrane is circular.

5. The improved gas meter diaphragm assembly as claimed in claim 1 wherein a relatively rigid center member formed substantially in the outline of said central portion overlies and is bonded to said center portion.

6. The improved gas meter diaphragm assembly as claimed in claim 1 wherein the bottom of said trough is rounded and the top of said ridge is rounded.

7. The improved gas meter diaphragm assembly as claimed in claim 6 wherein said ridge is of smaller cross-sectional size than said trough.

References Cited by the Examiner

UNITED STATES PATENTS

| 2,002,870 | 5/1935 | Rockafellow | 73—279 X |
| 2,078,835 | 4/1937 | Brisson | 92—103 |
| 2,578,730 | 12/1951 | Nicholson et al. | 92—100 |
| 2,809,521 | 10/1957 | Waddell | 73—280 |
| 2,874,569 | 2/1959 | Gray | 73—279 |
| 2,976,726 | 3/1961 | St. Clair et al. | 73—279 |
| 3,072,150 | 1/1963 | Hastings et al. | 92—98 |
| 3,079,642 | 3/1963 | Needham et al. | 264—294 |
| 3,090,079 | 5/1963 | Gottschald | 264—294 |
| 3,113,592 | 12/1963 | Mercier | 92—98 X |
| 3,180,145 | 4/1965 | St. Clair | 73—278 |

FOREIGN PATENTS

| 933,764 | 8/1963 | Great Britain. |

RICHARD C. QUEISSER, *Primary Examiner.*

E. D. GILHOOLY, *Assistant Examiner.*